United States Patent
Driscoll et al.

(10) Patent No.: US 7,607,291 B2
(45) Date of Patent: Oct. 27, 2009

(54) ENGINE SYSTEM ARRANGEMENT WITH ON-BOARD AMMONIA PRODUCTION AND EXHAUST AFTER TREATMENT SYSTEM

(75) Inventors: Josh Driscoll, Dunlap, IL (US); Wade J. Robel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 99 days.

(21) Appl. No.: 11/242,589

(22) Filed: Oct. 3, 2005

(65) Prior Publication Data

US 2007/0074506 A1 Apr. 5, 2007

(51) Int. Cl.
*F01N 3/00* (2006.01)
(52) U.S. Cl. .............................. 60/286; 60/274; 60/288; 60/295; 60/301
(58) Field of Classification Search .................... 60/274, 60/286, 287, 288, 295, 301
See application file for complete search history.

(56) References Cited

U.S. PATENT DOCUMENTS

| | | | | |
|---|---|---|---|---|
| 5,746,052 | A * | 5/1998 | Kinugasa et al. | 60/274 |
| 6,047,542 | A * | 4/2000 | Kinugasa et al. | 60/274 |
| 6,109,024 | A * | 8/2000 | Kinugasa et al. | 60/285 |
| 6,244,043 | B1 | 6/2001 | Farmer et al. | |
| 6,289,672 | B1 | 9/2001 | Katoh et al. | |
| 6,336,320 | B1 | 1/2002 | Tanaka et al. | |
| 6,813,884 | B2 * | 11/2004 | Shigapov et al. | 60/295 |
| 6,843,055 | B2 | 1/2005 | Ootake | |
| 2005/0025692 | A1 | 2/2005 | Becher et al. | |
| 2006/0010859 | A1 * | 1/2006 | Yan et al. | 60/286 |
| 2006/0096275 | A1 | 5/2006 | Robel et al. | |

OTHER PUBLICATIONS

Hamada, Kato, Imada, Kikkawa and Yamada; A Unique Titania-Based SCR NOx Catalyst For Diesel Exhaust Emission Control; Apr. 2005; pp. 1-7; SAE International; Detriot, Michigan.
Ogunwumi, Fox, Patil and He; In-Situ $NH_3$ Generation For SCR $NO_x$ Applications; Oct. 2002; pp. 1-6; SAE International; San Diego, California.

* cited by examiner

*Primary Examiner*—Thomas E Denion
*Assistant Examiner*—Diem Tran
(74) *Attorney, Agent, or Firm*—Liell & McNeil

(57) ABSTRACT

An engine system includes first and second combustion chamber groups that supply exhaust to respective first and second exhaust passages. NOx in the exhaust of the first combustion group is converted to ammonia, such as by enriching the exhaust with fuel and then passing the mixture over an appropriate catalyst. Particles are trapped and continuously oxidized through appropriate placement of one or more particle traps coated with an appropriate oxidizing catalyst. NOx in the second passage from the second combustion group is combined with ammonia produced in the first passage and converted to nitrogen and water in a merged passage before being vented to atmosphere. This conversion is accomplished by passing the merged exhaust over an appropriate selective catalytic reduction catalyst.

19 Claims, 2 Drawing Sheets

ENGINE SYSTEM ARRANGEMENT WITH ON-BOARD AMMONIA PRODUCTION AND EXHAUST AFTER TREATMENT SYSTEM

TECHNICAL FIELD

The present disclosure relates generally to engine systems with after treatment systems to reduce undesirable emissions, and more particularly to an exhaust after treatment system with the ability to reduce particulate and NOx emissions, at least in part via a catalized reaction with a reductant.

BACKGROUND

Increasingly stringent emissions requirements are constantly pressuring researchers to perfect existing ways, and devise new ways, to reduce undesirable emissions. Among these undesirable emissions are particulate matter and NOx. Although there has been much progress in developing methods of operating internal combustion engines in ways that reduce undesirable emissions, it may be impossible to develop a fossil fuel combustion strategy that completely avoids the production of undesirable emissions. Therefore, much effort has been directed to aftertreatment strategies that remove or change undesirable emissions into more acceptable chemical compounds before the exhaust is vented to atmosphere.

One strategy that has been commercially utilized for reducing NOx emissions has been to react NOx in the exhaust with a reductant, such as urea, in the presence of an appropriate catalyst to produce nitrogen and water. While these systems can be somewhat effective, they are problematic in that they require an external urea tank that must be periodically refilled. Another potential reductant could be ammonia, but any supply strategy that requires the refilling of reductant tanks to maintain a supply also requires an infrastructure to support motorized vehicles that require a reductant resupply.

Current strategies for reducing particulate matter emissions often involve the use of particle traps that trap the particles before they can be vented to atmosphere. While this strategy can be quite effective, such traps often require periodic regeneration by burning to oxidize the particles. These regeneration strategies often require some open or closed loop control system for periodically regenerating the particle trap. These control systems can fail, and even if they do not fail, these particle traps cyclically apply increased back pressure on the engine which decreases efficiency to some measurable extent. In some instances, particularly at prolonged low load conditions, there may not be enough heat generated by the engine to regenerate the particle trap without some auxiliary heat source or by temporarily increasing engine output for the sole purpose of particle trap regeneration.

The present disclosure is directed to one or more of the problems set forth above.

SUMMARY OF THE DISCLOSURE

In one aspect, a method of operating an engine system includes a step of supplying exhaust from a first combustion chamber group to a first exhaust passage. Exhaust from a second combustion chamber group is supplied to a second exhaust passage. NOx is converted to ammonia in the first exhaust passage. Particles are oxidized using NOx in the second exhaust passage. The first and second exhaust passages are merged into a third exhaust passage.

In another aspect, a method of treating combustion exhaust includes a step of splitting the exhaust between a first passage and a second passage. Exhaust in the first passage is enriched relative to exhaust in the second passage. NOx, hydrocarbons and oxygen in the first passage are converted to ammonia, carbon monoxide and hydrogen. The first and second passage are then remerged into a merged passage. NOx, carbon monoxide and hydrogen are converted to ammonia in the merged passage.

In still another aspect, a method of operating a combustion exhaust after treatment system includes a step of reacting exhaust NOx with a reductant to produce nitrogen and water. An upstream exhaust passage is split into a first exhaust passage and a second exhaust passage. Reductant is converted to NOx in the second exhaust passage. The first and second exhaust passages are merged into a merged exhaust passage. NOx is reacted with reductant in the merged passage to produce nitrogen and water.

DETAILED DESCRIPTION

Figure 1:
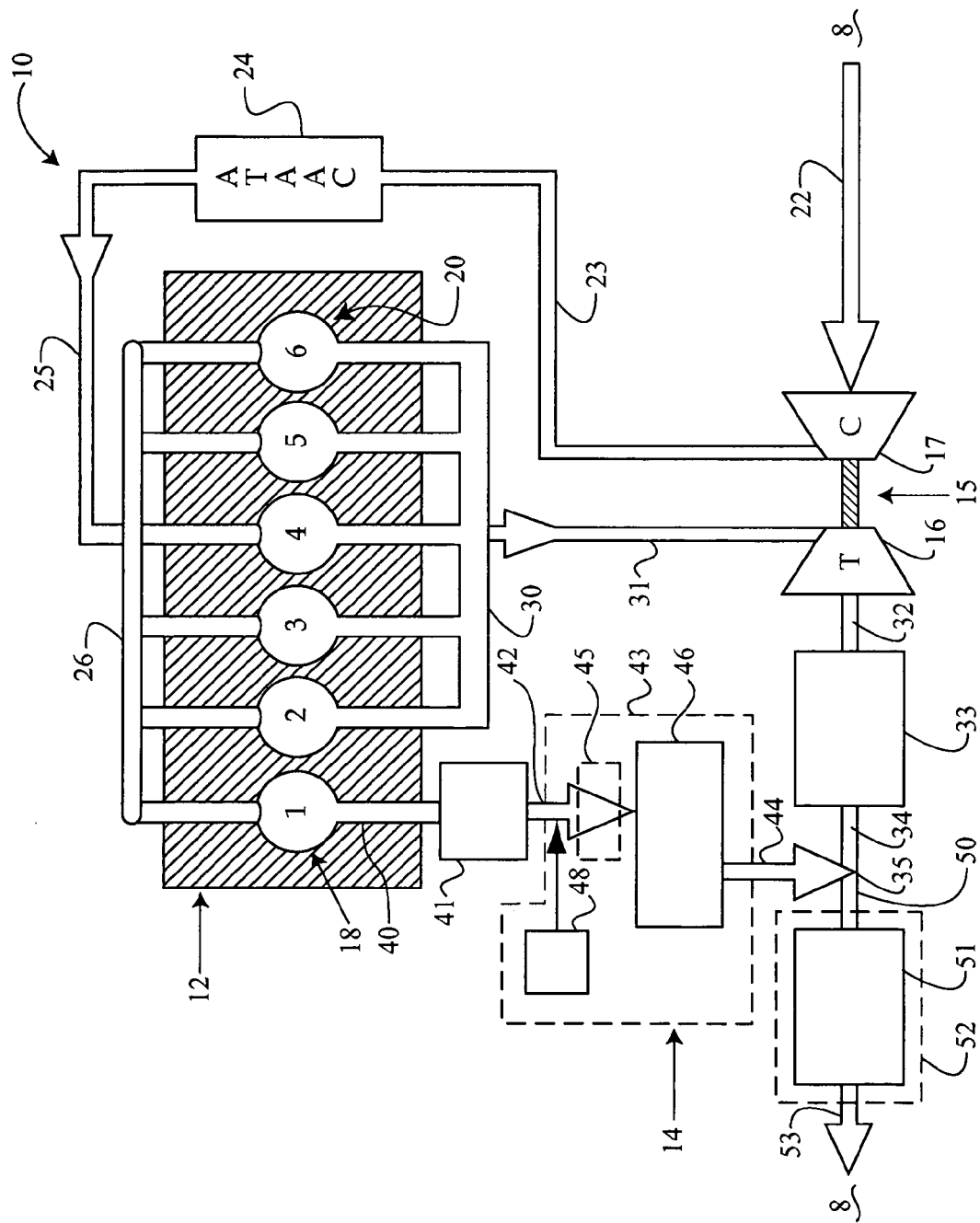
FIG. 1 is a schematic illustration of an engine system according to one aspect of the present disclosure.

Referring to FIG. 1, an engine system 10 includes an air intake 22 that receives air from atmosphere 8 and vents exhaust back to atmosphere 8 via a tailpipe 53. Engine system 10 includes a first combustion chamber group 18 and a second combustion group 20. In the illustrated example, the first and second combustion chamber groups 18, 20 are part of a single engine 12. However, those skilled in the art will appreciate that engine system 10 could include two or more separate engines where the first and second combustion chamber groups are located in the respective engines. In the illustrated example, the second combustion chamber group 20 is primarily responsible for producing the bulk of the power output of the engine, and the first combustion group 18 is generally responsible for creating excessive NOx for conversion to ammonia. The ammonia is later reacted with NOx produced by the second combustion group 20 to produce nitrogen and water that is vented to atmosphere 8 via tailpipe 53. Nevertheless, some portion of the power output of engine system 10 can be produced by the first combustion chamber group 18.

In the illustrated embodiment, the first combustion chamber group 18 includes only a single cylinder; however, those skilled in the art will appreciate that any number of cylinders and/or a separate engine could be devoted to the first combustion chamber group 18. Likewise, the second combustion chamber group is illustrated as including a plurality of engine cylinders, but those skilled in the art will appreciate that the second group could be as few as a single engine combustion chamber. Finally, the engine system 10 is shown as a typical reciprocating piston internal combustion engine, but those skilled in the art will appreciate that other alternative combustion arrangements could be possible without departing from the intended scope of the present disclosure. The power produced by the separate first and second combustion chamber groups 18, 20 are preferably combined, but may be separated. For example, the power produced by the first combustion chamber group 18 may be utilized only for powering pumps and other auxiliary systems that support the second combustion chamber group 20, or are used for purposes entirely unrelated to the second combustion chamber group.

In the illustrated embodiment, the first and second combustion chamber groups 18, 20 receive cooled compressed air from a common intake manifold 26 connected to a cooled compressed air supply passage 25, which in turn is connected to an air to air after cooler 24 in a conventional manner. The intake air from atmosphere 8 enters air intake 22, travels through a compressor 17 and is supplied to air to air after cooler 24 via a compressed air supply passage 23, also in a conventional manner. Fuel is supplied to the respective first and second combustion chamber groups 18, 20 in any manner known in the art, such as by direct fuel injection. Although not so limited, the first and second combustion chamber groups 18, 20 preferably operate in a compression ignition cycle typical to the combustion of distillate diesel fuels. However, the present disclosure also contemplates other strategies, such as spark ignition and/or different fuels, such as natural gas and gasoline, and also contemplates scenarios in which the first and second combustion chamber groups 18 and 20 consume different types of fuel, without departing from the intended scope of the present disclosure.

Although not necessary, exhaust from at least one of the first and second combustion chamber groups 18, 20 can be supplied to a turbine 16 of a turbocharger to power a compressor 17, which serves to compress incoming intake air. In the illustrated engine system 10, only exhaust from the second combustion chamber group 20 is supplied to turbocharger 15. However, those skilled in the art will appreciate that in other embodiments, only exhaust from the first combustion chamber group 18 powers a turbocharger, or the exhaust from the first combustion chamber group 18 might power a separate turbocharger, or the same turbocharger associated with the second combustion chamber group 20 without departing from the intended scope of the present disclosure. Thus, any turbocharger(s) arrangement, or none at all, associated with the first and second combustion chamber groups 18, 20 is contemplated.

Engine system 10 includes an exhaust after treatment system 14 that includes different features devoted respectively to exhaust produced by the first and second combustion chamber groups 18, 20 before being merged upstream of a common tailpipe 53. With regard to the first combustion chamber group 18, it is preferably operated using a high NOx production control algorithm so that excess NOx is generated. For instance, one strategy might be to operate in a near stochiometric mode such that the fuel burns relatively hot and a large amount of NOx is produced. One possible control strategy for the first combustion chamber group 18 might be to inject a first amount of fuel early in the compression stroke, and auto-ignite that charge during or shortly before injection of a second amount of fuel in order to produce a relatively hot combustion event that produces excess NOx.

In any event, exhaust from the first combustion chamber group 18 is supplied to an exhaust passage 40. In one optional version of the present disclosure, a particulate filter 41 is connected to exhaust passage 40. In one option, particulate filter 41 might be an uncoated particulate filter located in close enough proximity to combustion chamber group 18 that heat produced from combustion combined with some free oxygen in the post combustion exhaust is sufficient to continuously oxidize particulate matter produced by first combustion chamber group 18. However, other particulate trapping strategies are also contemplated, including but not limited to those that require cyclic regeneration, or any other particulate trapping strategy known in the art, including one coated with an appropriate catalyst. The particulate filter 41, if any, is connected to exhaust passage 42, which is connected to an exhaust aftertreatment segment 43. The purpose of exhaust aftertreatment segment 43 is generally to facilitate the conversion of the excess NOx produced by first combustion chamber group 18 into an appropriate reductant, such as ammonia, which is then later used to react with NOx from the second combustion chamber group 20 to produce relatively harmless nitrogen and water before exiting tailpipe 53. In the example engine system 10 shown in FIG. 1, the NOx to ammonia conversion is facilitated by enriching the exhaust, such as via a fuel injector 48, and then passing the enriched exhaust over an appropriate ammonia catalyst 46 to facilitate a reaction of the hydrocarbons plus NOx to produce ammonia before exiting exhaust aftertreatment section 43 into exhaust passage 44. Thus, by the time the exhaust from first combustion chamber group 18 arrives at exhaust passage 44, it should include relatively low levels of NOx, but relatively high levels of ammonia. Exhaust passage 44 merges with an exhaust passage 34 that carries exhaust originating from the second combustion chamber group 20 at an exhaust passage merger 35. In one alternative embodiment, a reforming catalyst 45 might be included upstream from ammonia catalyst 46. Reforming catalyst 45 would act to reform hydrocarbons, but preferably leave NOx alone to further increase ammonia produced downstream as the exhaust passes over an appropriate ammonia catalyst 46.

Exhaust from the second combustion chamber group 20 is supplied to an exhaust manifold 30 in a conventional manner, which in turn enters an exhaust passage 31 that passes through turbine 16 of turbocharger 15 before arriving at exhaust passage 32. The exhaust passage 22 is connected to a particulate filter 33, which may be a catalyzed diesel particulate filter that facilitates the oxidation of particulate matter using NOx present in the exhaust in conjunction with an appropriate catalyst. Thus, in both of the particulate filters 41 and 33 described with the present disclosure, the oxidation of particulate matter is done continuously, rather than being trapped and cyclically oxidized as is done in some other particulate trap strategies known in the art.

In the illustrated embodiment, some of the NOx produced by the second combustion chamber group 20 is consumed in facilitating oxidation of particulate matter continuously as the exhaust passes through catalyzed diesel particulate filter 33 before arriving at exhaust passage 34. Those skilled in the art will appreciate that the second combustion chamber group 20 are likely controlled with a combustion algorithm that differs from that governing the first combustion chamber group 18. In one embodiment, the second combustion chamber group 20 may be operated with a relatively low NOx production control algorithm, but those skilled in the art will recognize that even such a strategy will result in some substantial amount of NOx entering exhaust manifold 30. In one preferred version of the present disclosure, the respective first and second combustion chamber groups 18 and 20 are operated in such a fashion that the amount of ammonia entering exhaust passage merger 35 from exhaust passage 44 matches the amount of NOx entering merger 35 from exhaust passage 34. Thus, downstream from exhaust passage merger 35 and exhaust passage 50, about equal amounts of NOx and ammonia are present.

Merged exhaust passage 50 is connected to an exhaust aftertreatment segment 52, which is connected to tailpipe 53. In the example embodiment illustrated, engine system 10 includes a selective catalytic reduction catalyst 51 in exhaust aftertreatment segment 52. The catalyst chosen for SCR 51 is chosen to facilitate a reduction reaction between the NOx and ammonia to produce nitrogen and water, which is vented out of tailpipe 53 to atmosphere 8. Thus, the preferably equal amounts of NOx and ammonia upstream from SCR catalyst 51 cancel one another in the reduction reaction so that very low amounts, if any, of NOx and/or ammonia leave tailpipe 53 into atmosphere 8.

Figure 2:
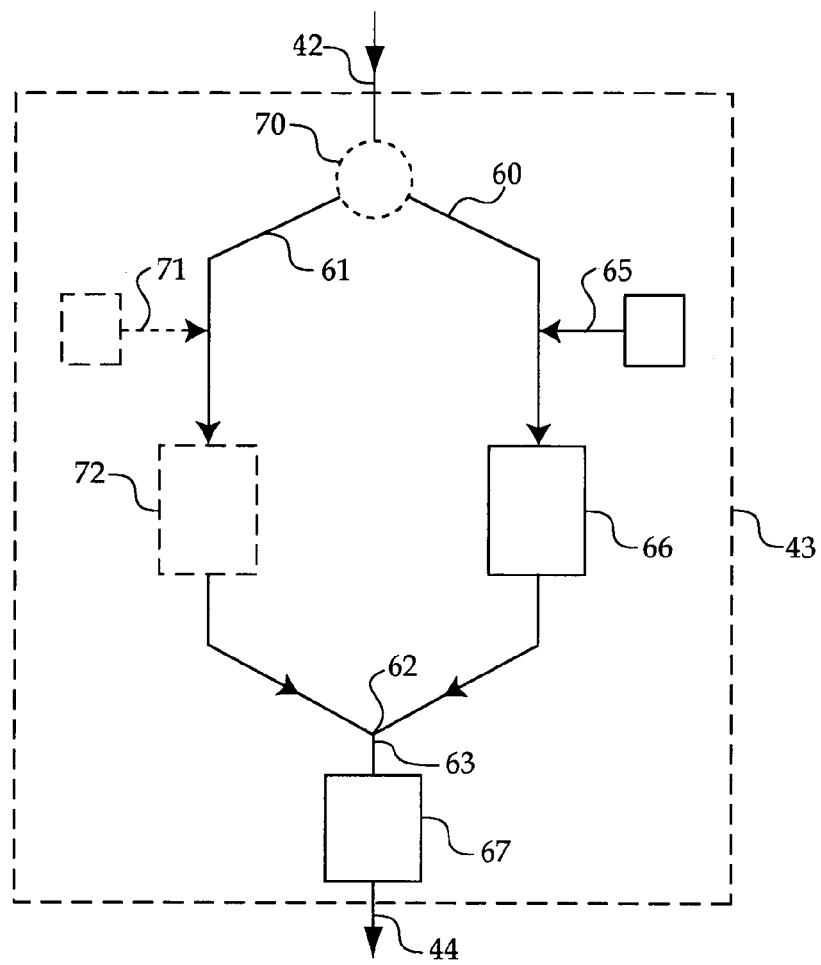
FIG. 2 is a schematic illustration of alternative embodiments of a portion of the exhaust after treatment system shown in FIG. 1.

Referring now to FIG. 2, several alternative embodiments are illustrated for exhaust aftertreatment segment 43 shown in FIG. 1. Recalling, it is this portion of exhaust aftertreatment system 14 that serves to produce ammonia from the combustion products generated by first combustion group 18. In the alternative embodiment shown in FIG. 2, exhaust passage 42 is split into a first exhaust passage 60 and a second exhaust passage 61, which are rejoined downstream at an exhaust passage merger 62 that connects to merged exhaust passage 63. Depending upon the options chosen, the structure will preferably distribute unequal amounts of exhaust into first and second exhaust passages 60 and 61. In most of the examples illustrated in Table 1 below, a majority of the exhaust is channeled to second exhaust passage 61. Although the relative amounts of fuel channeled to the respective first and second exhaust passages 60 and 61 may be fixed, this disclosure also contemplates the inclusion of a valve 70 which permits these relative proportions to be adjusted. In a more sophisticated version of the present disclosure, valve 70 would be electronically controlled according to an appropriate algorithm carried by an electronic control module (not shown). Such an option would permit the functioning of exhaust aftertreatment segment 43 to accommodate a variety of different operating conditions associated with the first and second combustion chamber groups 18 and 20.

In all of the alternatives, the portion of the exhaust in first exhaust passageway 60 is enriched, such as via a fuel injector 65. Downstream from fuel injector 65, the enriched exhaust may have a lambda on the order of 0.5 to 0.75. This enriched exhaust is then passed over a reforming catalyst 66 that facilitates at least two chemical reactions. First, some NOx is converted to ammonia, but not nitrogen, or is left unchanged. Second, oxygen and hydrocarbons in the enriched exhaust are converted to carbon monoxide and hydrogen, and to a lesser extent carbon dioxide and water. Catalyst 66 may include a zeolite or a metal oxide support material, such as alumina, zirconia or titania. Catalyst 66 may also include additive materials to provide high temperature stability, aid hydrocarbon reformation and slow NOx conversion to nitrogen. The additive might include nickel and/or iron. A precious metal, if any, may be present in small amounts, because of its tendency to reduce NOx (especially rhodium). The precious metal might be silver, palladium, but platinum is a possibility. One tested catalyst 66 that has shown good HC conversion and 0% NOx conversion (which is good at this location), is a Caterpillar Inc. made silver on aluminate catalyst. When the first and second exhaust passages 60 and 61 are remerged into merged exhaust passage 63, the exhaust may have a lambda on the order of 0.9. This partially treated exhaust is then passed over an ammonia catalyst that keeps the existing ammonia, if any, unchanged, but facilitates a reaction between NOx, hydrogen and carbon monoxide present to produce more ammonia. This exhaust, now with relatively high levels of ammonia, exits exhaust aftertreatment segment 43 into exhaust passage 44.

In a first alternative, a means for enriching the exhaust in second exhaust passage 61 is included, such as a fuel injector 71. This may allow for the exhaust in second exhaust passage 61 to be enriched to a lambda of about 1.05 before being remerged into merged exhaust passage 63. In still another alternative embodiment, the enriched exhaust in second exhaust passage 61, due the inclusion of fuel injector 71, is passed over an appropriate oxygen reduction catalyst that avoids NOx reactions, such that existing NOx remains as NOx, but oxygen and hydrocarbons in second exhaust passage 61 combine to yield carbon dioxide and water. The table below shows five examples of different embodiments for exhaust aftertreatment segment 43 that show different combinations of split proportions between first and second exhaust segments 60 and 61, as well as whether that specific embodiment includes fuel injector 71, optional oxygen reduction catalyst 72, or neither.

|  |  | Case 1: Enrichment of second leg and catalytic removal of $O_2$ | Case 2: Enrichment of second leg, but no catalyst (no $O_2$ removal) | Case 3: No enrichment of second leg | Case 2b: Enrichment of second leg, but no catalyst (no $O_2$ removal): favorable $O_2$, $H_2$, CO | Case 2b: No enrichment of second leg: favorable $O_2$, $H_2$, CO |
|---|---|---|---|---|---|---|
| Lambda out of engine | lambda | 1.2 | 1.2 | 1.2 | 1.2 | 1.2 |
| proportion of low to rich leg | % | 15% | 15% | 24% | 42% | 55% |
| Lambda in rich leg | lambda | 0.5 | 0.5 | 0.5 | 0.75 | 0.75 |
| proportion of flow to lean leg | % | 85% | 85% | 76% | 58% | 45% |
| Lambda in lean leg | lambda | 1.05 | 1.05 | 1.2 | 1.05 | 1.2 |
| Combined lambda | lambda | 0.9 | 0.9 | 0.9 | 0.9 | 0.9 |
| combined $O_2$ | molar % | 0.62% | 2.59% | 2.29% | 1.70% | 1.29% |
| combined NOx | ppmv | 3288 | 3309 | 2922 | 2169 | 1651 |
| combined CO | molar % | 1.10% | 1.10% | 1.72% | 2.94% | 3.78% |
| combined $H_2$ | molar % | 0.92% | 0.92% | 1.44% | 2.45% | 3.15% |
| combined $C_xH_y$ | ppmv | 1000 | 1900 | 1500 | 600 | 0 |
| combined Cl (reference) | ppmv | 14793 | 27762 | 22037 | 8925 | 0 |
| combined $NH_3$ | ppmv | 624 | 623 | 976 | 1665 | 2139 |
| $H_2 + CO - 2*O_2$ | molar % | 0.78% | −3.16% | −1.42% | 1.99% | 4.35% |

Figure 3:
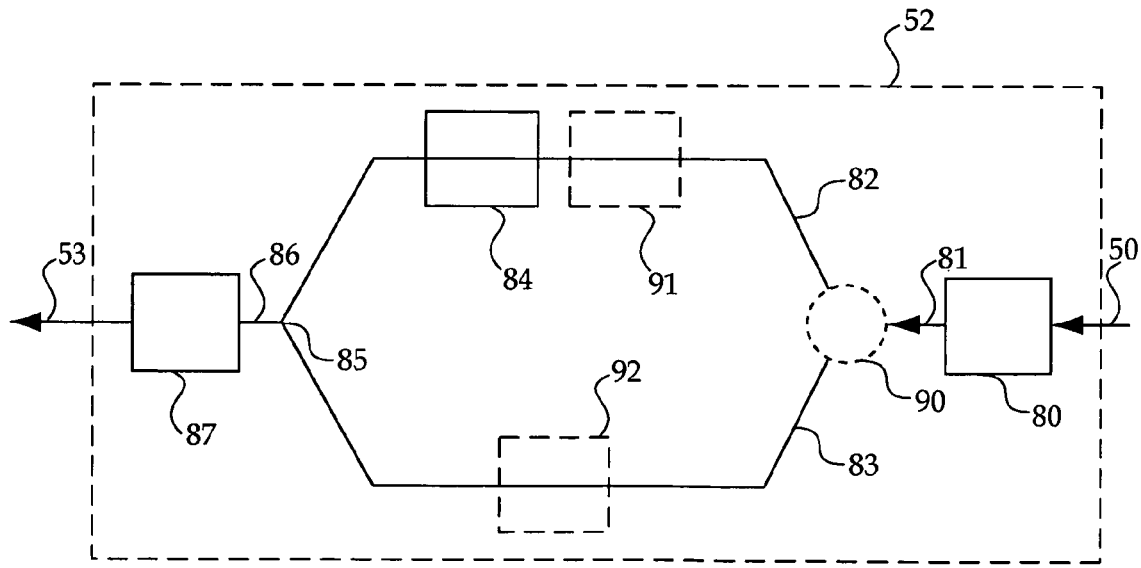
FIG. 3 is a schematic illustration of alternative embodiments to another portion of the exhaust after treatment system shown in FIG. 1.

Referring now to FIG. 3, other alternative embodiments for the exhaust aftertreatment segment 52 are illustrated. The purpose of this segment is to facilitate conversion of matched amounts of NOx and ammonia to relatively harmless nitrogen and water. However, these alternative embodiments recognize that it may be practically difficult to maintain an equal match of ammonia and NOx across a wide range of engine operating conditions for first and second combustion chamber groups 18 and 20. In particular, it might often be desirable to have an excess amount of ammonia relative to that of NOx to better facilitate a reduction reaction of all of the NOx that leaves some residual ammonia. These alternative embodiments recognize this desirability and seek to remove the excess ammonia before the same leaves the tailpipe 53 into atmosphere 8.

In a first alternative embodiment, the combined exhaust arriving from exhaust passage 50 is passed over a selective catalytic reduction catalyst 80 to facilitate a reduction reaction between NOx and ammonia to produce nitrogen, water, and possibly leave excess amounts of ammonia. Nevertheless, the present disclosure does not rule out the possibility that there would be excess NOx due to a possibility of an inadequate supply of ammonia to facilitate a reduction reaction with all of the NOx present. The flow in upstream exhaust passage 81 is then split into a first exhaust passage 83 and a second exhaust passage 83, and later joined at merger 85 into merged exhaust passage 86. Although predetermined relative proportions can be split into exhaust passages 82 and 83, such as equal amounts, these may be unequal in distribution. Furthermore, in at least one alternative embodiment, a valve 90 may be included so that the relative proportions of exhaust into first and second exhaust passages 82 and 83 can be adjusted. Furthermore, in a more sophisticated embodiment, valve 90 may be an electronically controlled valve governed by an appropriate control algorithm via an electronic control module (not shown). For instance, valve 90 may be controlled by sensing relative quantities of NOx and/or ammonia present in upstream exhaust passage 81. This information could then be used in further determining an appropriate split in the exhaust between first and second exhaust passages 82 and 83.

In another simpler embodiment, every other or some other proportion of the cells of a conventional substate would be coated with a diesel oxidation catalyst, so that separate passages 82 and 83 would be in a common housing. In one embodiment, the proportion of the exhaust in first exhaust passage 82 is passed over a conventional diesel oxidation catalyst 84. This facilitates the conversion of ammonia present back into NOx. Preferably, the relative proportions of NOx and ammonia are about equal in merged exhaust passage 86. This combined exhaust is then passed over another selective catalytic reduction catalyst 87 to allow for a reduction reaction between the remaining NOx and ammonia, and turn the same into nitrogen and water for venting to atmosphere 8 via tailpipe 53. Thus, in this version of exhaust aftertreatment segment 52, the strategy facilitates an excess amount of ammonia to be cleaned up before venting of the treated exhaust to atmosphere. In still another alternative embodiment, the selective catalytic reduction catalyst 80 is omitted, and instead equivalent SCR catalysts 91 and 92 are positioned in respective first and second exhaust passages 82 and 83 to produce a similar result.

INDUSTRIAL APPLICABILITY

The present disclosure finds potential application in any engine system where NOx is a byproduct of combustion. Although the present disclosure is illustrated in the context of a single engine 12 that is divided between first and second combustion chamber groups 18 and 20, the disclosure also finds potential application into engine systems that have two separate engines. Also, the reductant cleanup strategy best illustrated in association with FIG. 3, finds potential application in engine systems that are not divided between first and second combustion groups as in the illustrated embodiment of FIG. 1. For instance, in conventional engines in which urea is used as a reductant, the cleanup strategy of FIG. 3 finds potential application by permitting the usage of excess urea to better facilitate the reduction reaction with NOx, but still avoid exhausting excess urea from tailpipe 53. Thus, the present disclosure finds potential application in engine systems that do not facilitate onboard reductant production.

When engine system 10 is operated, a desired power output is determined. Depending upon how the power output from first and second reduction chamber groups 18 and 20 will be allocated, the respective control algorithms for the first and second combustion chamber groups are determined such that the power output demand is met, while the exhaust constituents facilitate the appropriate reactions in aftertreatment system 14 to result in little or no NOx and/or reductant and/or particulate matter output from tailpipe 53. When the engine system includes the exhaust aftertreatment segment 43 of FIG. 2, higher onboard ammonia production levels can be achieved than that probable with simply operating first combustion chamber group 18 in a high NOx production mode. This strategy in turn will allow for the second combustion chamber group 20 to be operated in a manner that allows for more NOx production, since more ammonia will be available to react with the same. In addition, if the engine system includes the alternative reductant cleanup strategy illustrated in association with the aftertreatment segment 52 of FIG. 3, a more efficient strategy for reacting NOx with ammonia can be achieved by allowing for excess ammonia quantities that are later cleaned up downstream before venting to atmosphere 8.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims.

What is claimed is:

1. A method of operating an engine system, comprising the steps of:
    supplying exhaust from a first combustion chamber group to a first exhaust passage;
    supplying exhaust from a second combustion chamber group to a second exhaust passage;
    converting NOx to ammonia in the first exhaust passage;
    oxidizing particles with NOx in the second exhaust passage;
    merging the first and second exhaust passages into a third exhaust passage;
    including a step of reacting NOx with ammonia in the third exhaust passage to produce nitrogen and water;
    wherein the oxidizing step is performed at least in part with a second catalyst; and
    oxidizing particles in the first exhaust passage at least in part with a first catalyst that is chemically different from the second catalyst.

2. The method of claim 1 including a step of reacting NOx with ammonia in the third exhaust passage to produce nitrogen and water.

3. The method of claim 2 including a step of supplying fuel into the first exhaust passage;
    reforming hydrocarbons in the first exhaust passage upstream from the converting step.

4. The method of claim 2 including a step of rotating a turbine with gas flow in at least one of the first, second and third exhaust passages.

5. The method of claim 2 wherein the oxidizing step is performed passively and continuously during the supplying steps.

6. The method of claim 2 including a step of fluidly connecting the third passage only to the first exhaust passage, the second exhaust passage and atmosphere.

7. A method of treating combustion exhaust comprising the steps of:
- splitting the exhaust of a merged exhaust passage between a first passage and a second passage;
- enriching exhaust in the first passage relative to exhaust in the second passage;
- converting NOx, hydrocarbons and oxygen in the first passage to ammonia, carbon monoxide and hydrogen;
- re-merging the first passage with the second passage into a merged passage;
- converting NOx, carbon monoxide and hydrogen to ammonia in the merged passage.

8. The method of claim 7 including a step of oxidizing hydrocarbons in the second passage.

9. The method of claim 7 including a step of enriching exhaust in the second passage.

10. The method of claim 7 including a step of leaving exhaust in the second passage untreated and unenriched.

11. The method of claim 7 wherein the enriching step includes injecting fuel into the first passage.

12. The method of claim 11 wherein the splitting step includes a step of routing more exhaust into the second passage than the first passage.

13. The method of claim 11 wherein the converting step in the first passage includes a step of passing enriched exhaust over a catalyst.

14. A method of operating a combustion exhaust aftertreatment system, comprising the steps of:
- reacting exhaust NOx with an excess amount of reductant, which includes at least one of urea and ammonia, to produce nitrogen, excess reductant and water;
- splitting an upstream exhaust passage into a first exhaust passage and a second exhaust passage;
- converting a portion of the excess reductant to NOx in the second exhaust passage;
- merging the first and second exhaust passages into a merged exhaust passage; and
- reacting NOx with an other portion of the excess reductant in the merged exhaust passage to produce nitrogen and water.

15. The method of claim 14 wherein the reductant is ammonia.

16. The method of claim 14 wherein the step of reacting exhaust NOx with a reductant is performed upstream from the splitting step.

17. The method of claim 14 wherein the step of reacting exhaust NOx with a reductant is performed in both the first and second exhaust passages.

18. The method of claim 14 wherein the splitting step includes routing more exhaust to one of the first and second exhaust passages than the other of the first and second exhaust passages.

19. The method of claim 14 including a step of supplying a reductant overdose into the upstream exhaust passage.

* * * * *